United States Patent [19]

Itoh et al.

[11] Patent Number: 5,757,471
[45] Date of Patent: May 26, 1998

[54] METHOD AND APPARATUS FOR PRODUCING INDEX PRINTS, AND DENSITY ADJUSTING METHOD

[75] Inventors: Toshio Itoh; Eiichi Kito; Kaoru Uchiyama; Toshiyuki Hiroishi, all of Kanagawa, Japan

[73] Assignee: Fuji Photo Film Co., Ltd., Kanagawa, Japan

[21] Appl. No.: 821,640

[22] Filed: Mar. 20, 1997

Related U.S. Application Data

[62] Division of Ser. No. 602,225, Feb. 15, 1996.

[30] Foreign Application Priority Data

| Mar. 3, 1995 | [JP] | Japan | 7-43871 |
| Mar. 13, 1995 | [JP] | Japan | 7-52284 |

[51] Int. Cl.$^6$ .................................................. G03B 27/72
[52] U.S. Cl. .......................... 355/71; 355/38; 355/77
[58] Field of Search ............................ 355/35, 38, 41, 355/71, 68, 77; 349/1, 2, 3, 104, 108, 109; 250/559.02, 559.04, 559.05

[56] References Cited

U.S. PATENT DOCUMENTS

| 4,805,039 | 2/1989 | Otake et al. | 386/52 |
| 4,933,773 | 6/1990 | Shiota et al. | 355/71 |
| 5,084,727 | 1/1992 | Maronian et al. | 355/71 |
| 5,424,802 | 6/1995 | Saita | 355/71 |
| 5,438,389 | 8/1995 | Kito et al. | 355/71 |
| 5,638,153 | 6/1997 | Zahn et al. | 355/71 |

FOREIGN PATENT DOCUMENTS

| 61-121665 | 6/1986 | Japan | H04N 1/40 |
| 61-122639 | 6/1986 | Japan | G03B 27/32 |
| 1-96634 | 4/1989 | Japan | G03B 27/32 |

*Primary Examiner*—A. A. Mathews
*Attorney, Agent, or Firm*—Sughrue, Mion, Zinn, Macpeak & Seas, PLLC

[57] ABSTRACT

A method and apparatus for producing index prints makes the trend of compensation for main prints coincide with the trend of compensation for the index prints. When a scanner determines an exposure compensation amount for each frame based on image data of each frame of a negative film, the information representing the exposure compensation amount for each frame is transmitted to the drive controllers via a controller. In a main print section, an exposure process is performed by the drive controller based on the information regarding the exposure compensation amount for each frame, thereby obtaining a main print. In an index print section, an exposure process is performed by the drive controller based on the same information regarding the exposure compensation amount for each frame, thereby obtaining an index print. Also, a density adjusting method easily and automatically adjust unevenness in density produced in an image printing stage. In a test mode, an image (gray image) with a uniform intermediate gradation is printed on a printing paper. A pixel having the maximum density is selected. Differences in density between the pixel having the maximum density and other pixels are calculated, and the gradations of the respective pixels are shifted based on the differences. Thus shifted gradations are registered as standards for the respective pixels.

4 Claims, 12 Drawing Sheets

F I G. 7
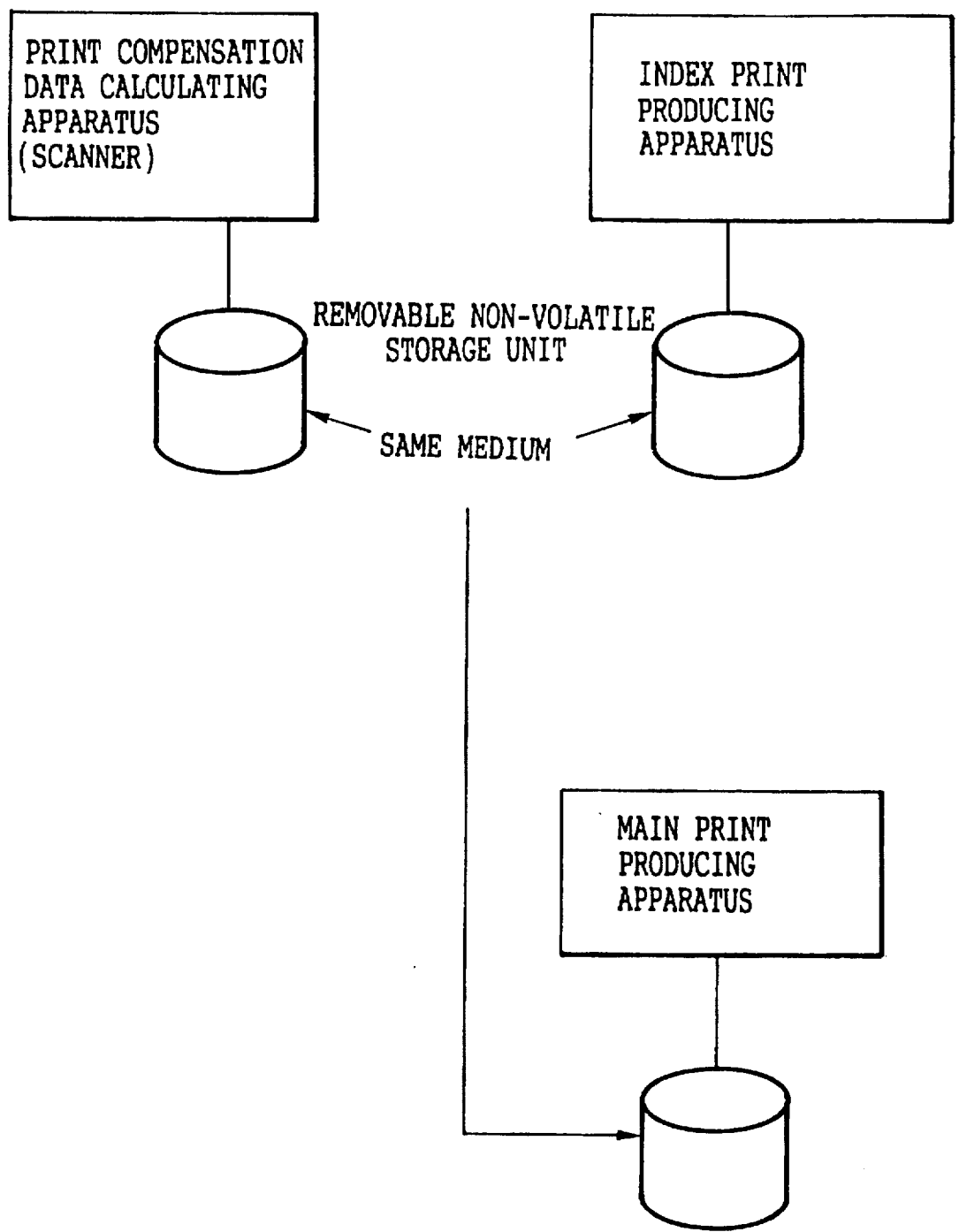

METHOD AND APPARATUS FOR PRODUCING INDEX PRINTS, AND DENSITY ADJUSTING METHOD

This is a Divisional of application Ser. No. 08/602,225 filed Feb. 15, 1996.

BACKGROUND OF THE INVENTION

1. Field of the Invention

The present invention relates to a method and apparatus for producing index prints, and to a density adjusting method. More particularly, the present invention relates to a method and apparatus for producing index prints wherein an index print process is performed in parallel with an ordinary print process in which images recorded on a photographic film are reproduced, by exposure, on a photosensitive material in a predetermined enlarged size, and wherein the index print process is performed such that images recorded in a plurality of frames of the photographic film are reproduced, by exposure, on the photosensitive material in a predetermined arrangement, thereby producing index prints. The present invention also relates to a method of adjusting the density of an image which is produced by surface exposure.

2. Description of the Related Art

Conventionally, prints corresponding to images in frames of a photographic film (main prints) are produced in a photographic printer. In such a photograph printer, an image recorded in each frame of a photographic film is scanned by a scanner, and the image information thus obtained (photometric data such as a cumulative transmission density) is input to a main print compensation data calculation apparatus. In this apparatus, compensation data (referred to as a main print compensation data, hereinafter) used in the exposure process are calculated based on the image information. The exposure process for the image of each frame is adjusted based on the main print compensation data.

An index pint is known (see JP-A-61-122639, for example). In such an index print, images on a plurality of frames are printed in a matrix in a reduced size. This index print facilitates searching pictures recorded on a piece of developed film. In an index printer for producing index prints, image information of each frame of a photographic film captured by a scanner is received, and compensation data (referred to as an index print compensation data, hereinafter) used in the exposure process are calculated from the received image information by an index print compensation data calculation apparatus. Exposure process for the image of each frame is adjusted based on the index print compensation data.

The index print compensation data calculation apparatus and the main print compensation data calculation apparatus are separate apparatuses. Therefore, compensation data for index prints and compensation data for main prints do not coincide with each other due to mechanical errors and variations in the environment and the like. This may cause the problem that the trend of compensation for index prints does not coincide with the trend of compensation for main prints.

Meanwhile, liquid crystal display devices have conventionally been used in a TV monitor, etc. Such liquid crystal display devices are fabricated using liquid crystal panels as a main component. Liquid crystal panels are also used in photographic printers in which an image is digitally displayed on a liquid crystal panel, and light passing through the liquid crystal panel is projected onto a photosensitive material so as to print the image thereon.

Such a photographic printer is used as an index printer, as disclosed in the above described JP-A-61-122639.

The assignee of the present invention has also proposed a photographic printer in which exposure for an index print and exposure for each frame is performed successively so as to produce index prints without decreasing the high speed processing performance of the photographic printer.

The photographic printer includes a photosensitive material transport section for providing an index print area after each set of printed images is reproduced from one piece of film, and an index print section for printing images for index print (index images) in the index print area. In the index print section, a liquid crystal panel is used as a print display means.

In photographic printers of the above-described type, when an exposure process is performed by irradiating parallel light rays onto a liquid crystal panel (hereinafter referred to as "surface irradiation"), unevenness is produced in the densities of prints due to unevenness in the intensity of the light rays from a light source. An ideal print with no unevenness in its density is shown on the left side in FIG. 9A, while a print with unevenness in its density is shown in on the right side in FIG. 9A. In these photographic printers, an optical device such as a diffusing plate is provided to eliminate unevenness in the intensity of light lays, thereby preventing unevenness in the densities of prints.

However, when such an optical device is built into a photographic printer, the number of components increases, and the size of the photographic printer increases. Also, optical adjustments such as adjustment of the focal distance must be performed after the optical device is built into the photographic printer during its manufacturing stage, and after the optical device is exchanged.

SUMMARY OF THE INVENTION

The present invention has been accomplished in view of the forgoing problems, and an object of the present invention is to provide a method and apparatus for producing index prints which can make the trend of compensation for index prints coincide with the trend of compensation for main prints.

Another object of the present invention is to provide a density adjusting method which can easily and automatically adjust unevenness in the density of prints which would be produced in an image printing stage.

A first aspect of the present invention provides a method for producing index prints in which an index print process is performed in parallel with an ordinary print process in which images recorded on a photographic film are reproduced, by exposure, on a photosensitive material in a predetermined enlarged size, and in which the index print process is performed such that images recorded in a plurality of frames of the photographic film are reproduced, by exposure, on the photosensitive material in a predetermined arrangement to produce index prints.

The method comprises the steps of receiving exposure compensation information for each frame calculated to produce a main print, and performing an exposure process for an image of each frame when an index print is formed, based on the exposure compensation information.

A second aspect of the present invention provides an apparatus for producing index prints in which an index print process is performed in parallel with an ordinary print process in which images recorded on a photographic film are reproduced, by exposure, on a photosensitive material in a predetermined enlarged size, and in which the index print process is performed such that images recorded in a plurality of frames of the photographic film are reproduced, by exposure, on the photosensitive material in a predetermind arrangement to produce index prints.

The apparatus comprises an exposure compensation information receiving apparatus for receiving exposure compensation information for each frame calculated to produce a main print, and an exposure apparatus for performing an exposure process for an image of each frame when an index print is formed, based on the exposure compensation information received by the exposure compensation information receiving apparatus.

A third aspect of the present invention provides a density adjusting method for a printer in which there is provided a liquid crystal panel in which a plurality of pixels are arranged in a matrix and each pixel is adjustable to a predetermined gradation, and wherein an image is displayed on the liquid crystal panel disposed on a path of exposure light such that each pixel of the liquid crystal panel is controlled based on a gradation which is set while using, as a standard, one of a first state in which each pixel allows the light to completely pass therethrough and a second state in which each pixel completely blocks the light.

The method comprises the steps of displaying an image with a uniform gradation on the liquid crystal panel, obtaining a printed image of the image, measuring the density of the obtained printed image so as to select a pixel or a plurality of continuous pixels having the minimum or maximum density, calculating a difference in density between each pixel and the selected pixel or the selected plurality of continuous pixels and adjusting the gradation of each pixel based on the difference, and shifting the gradations of the pixels until one of the pixels reaches the first or second state while maintaining relative differences in gradation after the adjustment, and registering the shifted gradation of each pixel as a standard of each pixel.

In the first aspect of the present invention, in parallel with an ordinary print process in which images recorded on a photographic film are exposed on a photosensitive material in a predetermined enlarged size, exposure compensation information for each frame calculated to produce a main print is received, and an exposure process is performed based on the exposure compensation information to produce an index print from an image of each frame. Since the same compensation information is used for compensation in the exposure process for obtaining a main print for each of a plurality of frames and for compensation in the exposure process for obtaining an index print, the trend of compensation for the main prints can be made to coincide with the trend of compensation for index prints.

In the second aspect of the present invention, in parallel with an ordinary print process in which images recorded on a photographic film are exposed on a photosensitive material in a predetermined enlarged size, the exposure compensation information receiving apparatus receives exposure compensation information for each frame calculated to produce a main print. The exposure apparatus performs an exposure process based on the exposure compensation information to produce an index print from an image of each frame. Since the same compensation information is used for compensation in the exposure process for obtaining a main print for each of a plurality of frames and for compensation in the exposure process for obtaining an index print, the trend of compensation for the main prints can be made to coincide with the trend of compensation for index prints.

In the third aspect of the present embodiment, for example, when a state in which each pixel completely blocks light is used as a standard, the gradations of respective pixels of the liquid crystal panel are set to have a uniform gradation, and a printed image is obtained therefrom. The density of the printed image is measured to select a pixel or a plurality of continuous pixels having the maximum density. Differences in density between the pixel or a plurality of continuous pixels having the maximum density and other pixels are calculated, and the gradations of the respective pixels are adjusted based on the differences such that the respective pixels have a uniform density. The gradations of the pixels are shifted to approach the above-described state in which each pixel completely blocks light, while maintaining the relative differences of the adjusted gradations. When any one of the pixel (the selected pixel) becomes the state in which it completely blocks light, the shift of the gradations is stopped. Thus shifted gradations are registered as standards for the respective pixels. With this operation, unevenness in density of a print due to unevenness in the intensity of light, or deterioration of the liquid crystal panel which occurs during manufacture or with the passage of time can be eliminated. Since a density corresponding to a set gradation can be obtained, a desired image can be displayed to produce a print.

Also, it is possible to eliminate the necessity of an optical device for compensating unevenness in density, and the necessity of adjustment of the optical device. Moreover, density can easily be adjusted in a simplified manner, so the work for density adjustment can be automated.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 7 is a block diagram schematically showing the structure of the third embodiment;

PREFERRED EMBODIMENTS OF THE INVENTION

First Embodiment

A first embodiment of the present invention will now be described with reference to FIG. 1 through FIGS. 3A and 3B.

Figure 1:
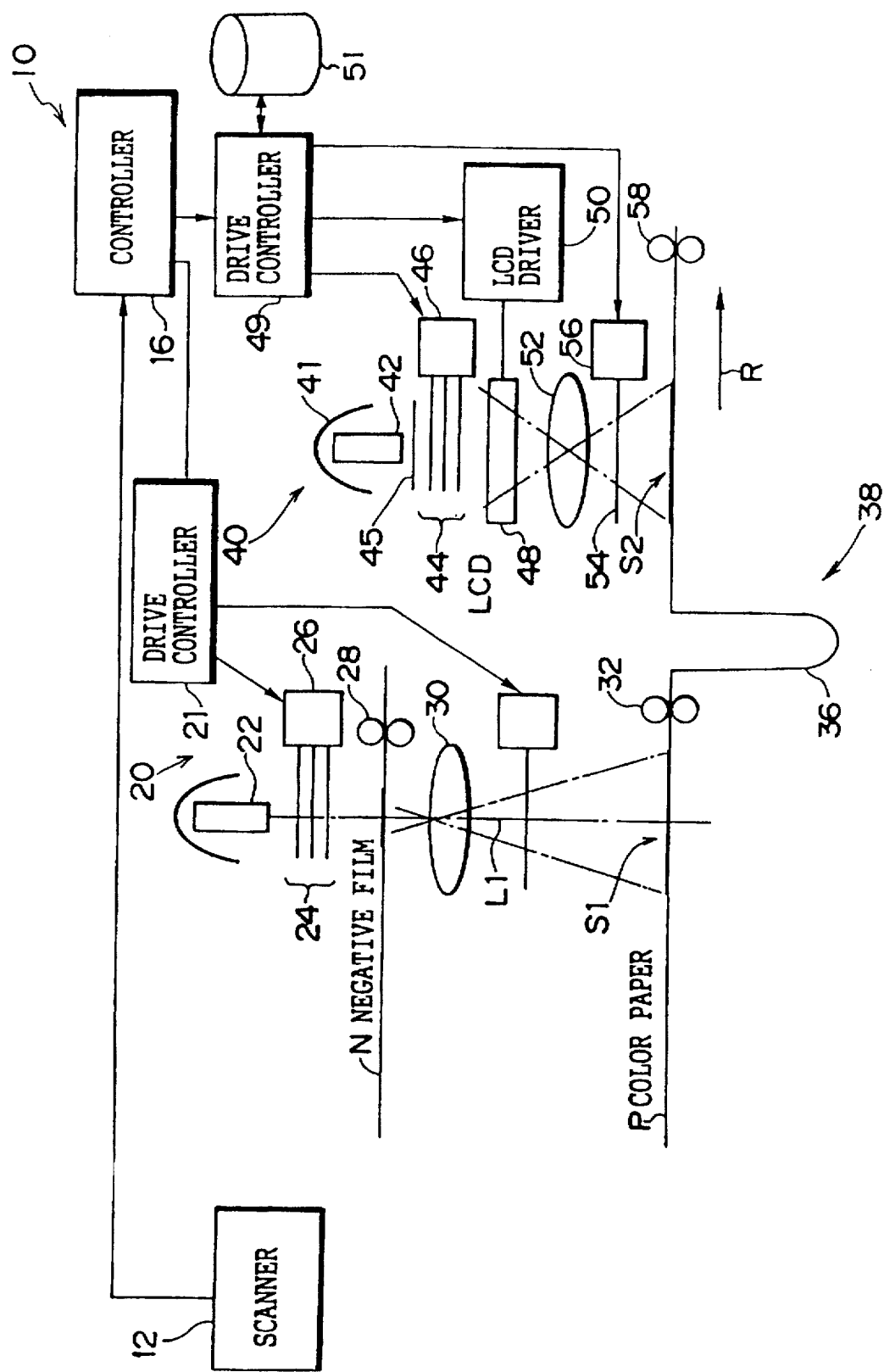
FIG. 1 is a schematic illustration showing the structure of a photographic printer according to a first embodiment of the present invention.

As shown in FIG. 1, a photographic printer 10 is provided with a controller 16 and a scanner 12. The controller 16 serves as a control section of the photographic printer 10. The scanner 12 is connected to the controller 16 and is adapted to capture an image recorded in each frame of a negative film and to transmit to the controller 16 image data corresponding to the captured image. The scanner 12 also determines an exposure compensation amount for each frame based on the image data of each frame and transmits the compensation amount to the controller 16.

Connected to the controller 16 are a drive controller 21 for controlling various devices of a main print section 20 which will be described later, and a drive controller 49 for controlling various devices of an index print section 40 which will be described. Information, including exposure compensation amounts for respective frames, is received by the controller 16 and is transmitted to the drive controllers 21 and 49. Image data of each frame received by the controller 16 is transmitted to the drive controller 49. Each of the drive controllers 21 and 49 includes a CPU, a RAM, a ROM, an input/output controller, etc., all of which are not illustrated.

A non-volatile storage unit 51 having a large storage capacity is connected to the drive controller 49, and information regarding an exposure compensation amount and image data for each frame received by the drive controller 49 are stored in the non-volatile storage unit 51. Also, information regarding an exposure compensation amount of each frame received by the drive controller 21 is stored in an unillustrated storage unit connected to the drive controller 21.

The photographic printer 10 has two print processing sections, i.e., a main print section 20 and an index print section 40. In the main print section 20, an image in each frame is printed onto a color paper P by exposure. In the index print section 40, an image for an index print (hereinafter referred to as "index image") is printed onto the color paper P by exposure. The index image includes images of a plurality of frames disposed in a matrix.

In the main print section 20, there are provided a lamp 22 for radiating light for exposure, and a light adjusting filter 24 composed of three filters for cyan, magenta and yellow. An amount of insertion for each filter of the light adjustment filter 24 (hereinafter referred to as a "filter insertion amount") is compensated by the drive controller 21 based on the exposure compensation amount for each frame described previously. Each filter is inserted into the path of light by the compensated filter insertion amount by a filter drive unit 26.

Light passing through the light adjusting filter 24 is irradiated onto a frame of a negative film N which has been positioned at a print position, coinciding with an optical axis L1, by a negative film transport unit 28, so that the light passes through an image of the frame. Light then passes through a projection lens 30, and is irradiated for a predetermined period of time onto a part of the color paper P which has been positioned at an exposure stage S1 by a paper transport unit 32. With this operation, images in the respective frames of the negative film N are printed onto the color paper P by exposure in the main print section 20.

In the index print section 40, a halogen lamp 42 is provided as a light source for exposure. Further, a heat preventing filter 45, a color separation filter 44, a liquid crystal panel 48, a projection lens 52, and a black shutter 54 are disposed, in this order, from the upper side in the path of light which is radiated from the halogen lamp 42 for exposure. Also, a reflector 41 is disposed right above the halogen lamp 42.

The heat preventing filter 45 reflects heat of the light used for exposure (hereinafter referred to as "exposure light" so as to prevent the color separation filter 44 from deteriorating due to heat of light passing through the color separation filter 44, thereby increasing its durability. The heat preventing filter 45 may be a filter capable of absorbing heat of exposure light irradiated onto the heat preventing filter 45.

Figure 2:
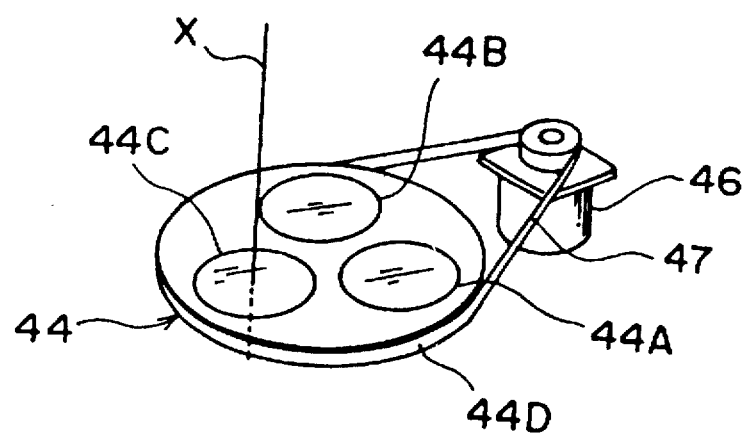
FIG. 2 is a perspective view showing the structure of a color separation filter and a filter drive unit used in the first through third embodiments of the present embodiment.
Figure 3:
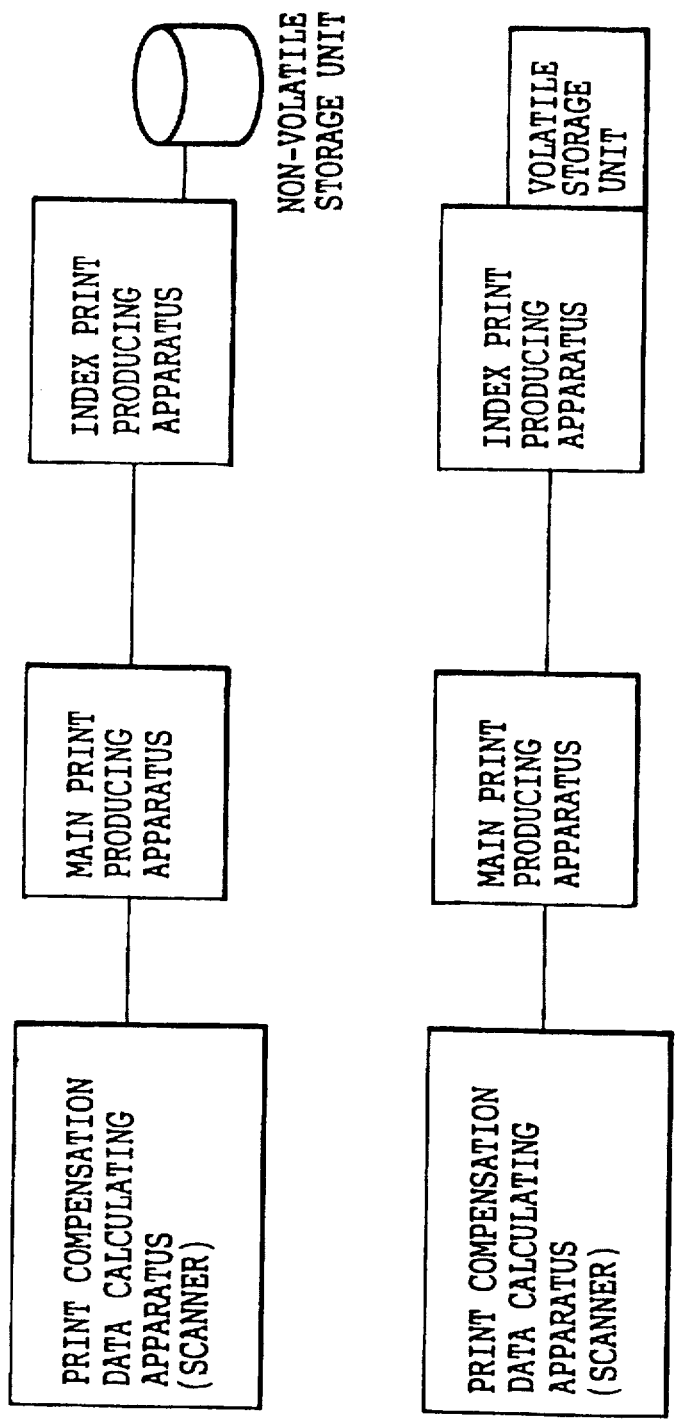
FIG. 3A is a block diagram schematically showing the structure of the first embodiment.
FIG. 3B is a block diagram showing a modification of the structure shown in FIG. 3A.

The color separation filter 44 is provided with three filters, i.e., an R filter 44A, a G filter 44B, and a B filter 44C, as shown in FIG. 2. These filters each have a circular shape of a small diameter, and are disposed in a circular base plate 44D having a larger diameter such that they penetrate the base plate 44D. A belt 47 is wound around the outer circumferential surface of the base plate 44D, and is also wound around an output shaft of a filter drive unit 46 which consists of a motor or the like. The above-described three filters are offset from the center axis of the base plate 44D. Therefore, when the base plate 44D is rotated by a drive force from the filter drive unit 46, the three filters are successively inserted into the path of exposure light in order to block off the light. The filter insertion amount of each filter of the color separation filter 44 is compensated by the drive controller 49 based on an exposure compensation amount for each frame described before. Thus, each filter is inserted into the path of light by the compensated filter insertion amount by a filter drive unit 46.

The liquid crystal panel 48 is disposed on a plane perpendicular to the optical axis of exposure light and is connected to the drive controller 49 via a liquid crystal panel driver 50 which drives the liquid crystal panel 48. Many pixels (for example, approximately 510,000 pixels) are regularly arranged on the display surface of the liquid crystal panel 48. Each of the pixels is caused to display white, black, and colors between white and black using an electrical means. The liquid crystal panel driver 50 receives image information, which has been temporarily stored in the non-volatile storage unit 51, from the drive controller 49. Image information for a few rolls of film is received by the liquid crystal panel driver 50 at a time. In the liquid crystal panel driver 50, data regarding an index image for each roll of film are produced, wherein the index image includes images of frames of the film disposed in accordance with a predetermined rule. From the index image data produced for one roll of film, image data for a plurality of frames (for example, image data for 10 frames, i.e., image data for two rows) are selected. After that, an image corresponding to the selected image data is formed on the liquid crystal panel 48. In a two-row image, it is possible to form on the liquid crystal panel 48 an image which corresponds to image data of only one color component of red, green or blue. The reason why the image formed on the liquid crystal panel 48 is determined so as to include images of 10 frames (images for two rows) is to maintain resolution at about 200–300 dpi.

The projection lens 52 receives an image which is formed on the liquid crystal panel 48 and projected by exposure light and reproduces it on the exposure stage S2 at a predetermined magnification.

The black shutter 54 moves to a position shown in FIG. 1 so as to block off exposure light after two rows of index images formed on the liquid crystal panel 48 have been printed by exposure. The black shutter 54 is retracted to a position away from the path of exposure light, when the exposure light should not be blocked off. Further, a paper transport unit 58 is provided to transport the color paper P in the direction of arrow R by using drive force of an unillustrated motor.

Moreover, in the conveying path of the color paper P, a reservoir section 38 is provided between the exposure stage S1 of the main print section 20 and the exposure stage S2 of the index print section 40 so as to absorb the difference in exposure process speed between the main print section 20 and the index print section 40. In the reservoir 38, the color paper P forms a free loop 36.

Next, operation of the first embodiment will now be described.

When an image recorded in each frame of the negative film N is captured by the scanner 12, image data representing the captured image are transmitted from the scanner 12 to the controller 16. The imaged data transmitted to the controller 16 is further transmitted to the drive controller 49. The image data which have reached to the drive controller 49 are stored in the non-volatile storage unit 51 by the drive controller 49.

The scanner 12 determines an exposure compensation amount for each frame based on the image data of each frame captured by the scanner 12. Information representing the exposure compensation amount determined for each frame is transmitted to the controller 16. Upon reception of information regarding exposure compensation amounts, the controller 16 sends the information regarding exposure compensation amounts to the drive controllers 21 and 49. The drive controller 49 stores the transmitted information regarding exposure compensation amounts for the respective frames into the non-volatile storage unit 51. Since the storage unit 51 is non-volatile, the stored information representing exposure compensation amounts for the respective frames and the image data are maintained even when the power of the photographic printer 10 is lost due to an accident such as a power failure. The drive controller 21 stores the transmitted information representing exposure compensation amounts for the respective frames in the unillustrated storage unit.

When exposure for printing is performed for each frame of the negative film N in the main print section 20, the drive controller 21 retrieves the information regarding exposure compensation amounts for the respective frames from the unillustrated storage unit, and compensates the filter insertion period of each filter of the light adjusting filter 24 based on the information regarding exposure compensation amounts for the respective frames. With this operation, each filter is inserted into the path of light by the filter drive unit 26 for the compensated filter insertion period, whereby compensation is performed based on the exposure compensation amounts for the respective frames determined by the scanner 12.

When exposure for printing is performed in the index print section 40 to obtain an index print, the drive controller 49 retrieves the information regarding exposure compensation amounts for the respective frames from the non-volatile storage unit 51, and compensates the filter insertion period of each filter of the light adjusting filter 44 based on the information regarding exposure compensation amounts for the respective frames. With this operation, each filter is inserted into the path of light by the filter drive unit 46 for the compensated filter insertion period, whereby compensation is performed based on the exposure compensation amounts for the respective frames determined by the scanner 12.

As is apparent from the above description, the same compensation amount is used for the compensation in the exposure process for obtaining a main print for each frame of the negative film N and for the compensation in the exposure process for obtaining an index print. Accordingly, the trend of compensation for the main print for each frame can be made to coincide with the trend of compensation for the index print.

Also, it is not necessary to separately dispose an apparatus for calculating an exposure compensation amount used in the exposure process for printing the index print, so the costs and size of the photographic printer 10 can be reduced.

In the exposure compensation performed in the index print section 40, compensation based on the exposure compensation amounts for the respective frames determined by the scanner 12 may be performed by various methods, other than the above described method in which the filter insertion period of each filter of the light adjusting filter 44 is compensated. For example, the above-described compensation may be performed by the method in which the brightness of three colors (i.e., R, G and B) of an image displayed on the liquid crystal panel 48 are compensated while maintaining the filter insertion period of each filter of the light adjusting filter 44 at a standard period.

The above-described first embodiment corresponds to the embodiment shown in FIG. 3A. That is, a scanner serving as a print compensation data calculating apparatus is connected to a main print producing apparatus (the controller 16 in the above-described embodiment). An index print producing apparatus (the index print section 40 in the above-described embodiment) is connected to the scanner via the main print producing apparatus. Exposure compensation data calculated by the scanner are received by the index print producing apparatus and the main print producing apparatus, and compensating operations are performed in these apparatuses based on the same exposure compensation data.

The exposure compensation data received by the index print producing apparatus (the index print section 40) are temporarily stored in an non-volatile storage unit 51, and retrieved therefrom when corresponding frames are subjected to exposure for printing. Although exposure compensation data are stored in the non-volatile storage unit 51 in the embodiment shown in FIG. 3A, exposure compensation data may be temporarily stored in a volatile storage unit (for example, the RAM built in the drive controller 49), as shown in FIG. 3B, for example, in cases where the amount of exposure amount compensation data to be temporarily stored is small and the period time between the time when the exposure compensation data are received and the time when exposure for printing the corresponding frames is performed to obtain an index print is short.

Second Embodiment

A second embodiment according to the present invention will be described with reference to FIG. 4, FIG. 5A and FIG. 5B.

Figure 4:
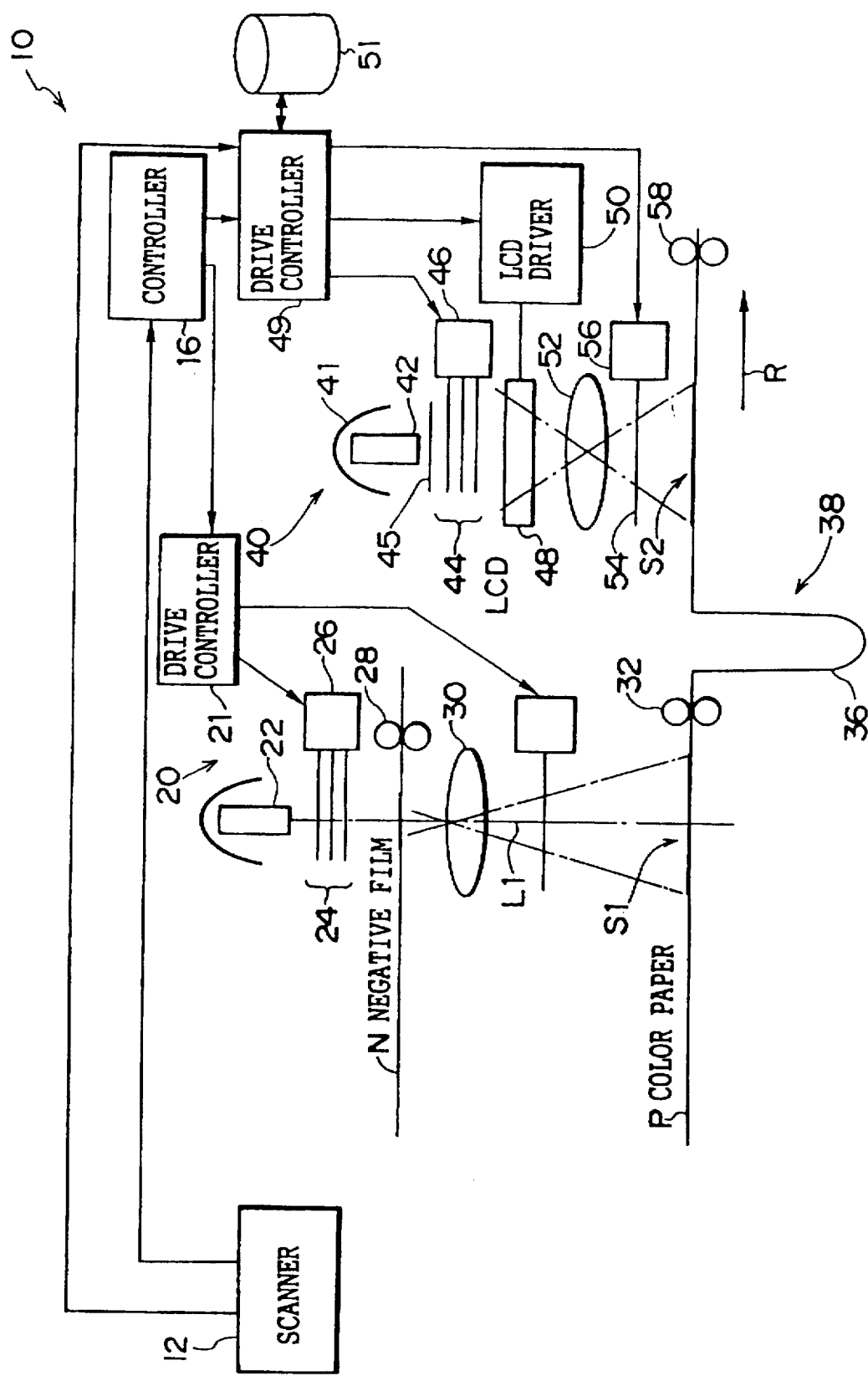
FIG. 4 is a schematic illustration showing the structure of a photographic printer according to a second embodiment of the present invention.

In the second embodiment, the photographic printer 10 which has been described in the first embodiment is modified as shown in FIG. 4. That is, the drive controller 49 and the scanner 12 are directly connected with each other so that information regarding exposure compensation amounts for respective frames of a negative film N determined by the scanner 12 is directly transmitted to the drive controller 49.

Next, operation of the second embodiment will be described.

When an image recorded in each frame of the negative film N is captured by the scanner 12, image data representing the captured image are transmitted from the scanner 12 to the drive controller 49. The transmitted imaged data are stored in the non-volatile storage unit 51 by the drive controller 49.

The scanner 12 determines an exposure compensation amount for each frame based on the image data of each frame captured by the scanner 12. Information representing the exposure compensation amount determined for each frame is transmitted to the controller 16 and the drive controller 49.

The drive controller 49 stores the transmitted information regarding exposure compensation amounts for the respective frames into the non-volatile storage unit 51. Since the storage unit 51 is non-volatile, the stored information representing exposure compensation amounts for the respective frames and the image data are maintained even when the power of the photographic printer 10 is lost due to an accident such as a power failure.

When the controller 16 receives information representing exposure compensation amounts for the respective frames, the controller 16 transmits to the drive controller 21 the information regarding exposure compensation amounts for the respective frames. The drive controller 21 stores the transmitted information regarding exposure compensation amounts for the respective frames in the unillustrated storage unit.

When exposure for printing is performed for each frame of the negative film N in the main print section 20, the drive controller 21 retrieves the information regarding exposure compensation amounts for the respective frames from the unillustrated storage unit, and compensates the filter insertion period of each filter of the light adjusting filter 24 based on the information regarding exposure compensation amounts for the respective frames. With this operation, each filter is inserted into the path of light by the filter drive unit 26 for the compensated filter insertion period, whereby compensation is performed based on the exposure compensation amounts for the respective frames determined by the scanner 12.

When exposure for printing is performed in the index print section 40 to obtain an index print, the drive controller 49 retrieves the information regarding exposure compensation amounts for the respective frames from the non-volatile storage unit 51, and compensates the filter insertion period of each filter of the light adjusting filter 44 based on the information regarding exposure compensation amounts for the respective frames. With this operation, each filter is inserted into the path of light by the filter drive unit 46 for the compensated filter insertion period, whereby compensation is performed based on the exposure compensation amounts for the respective frames determined by the scanner 12.

As is apparent from the above description, the same compensation amount is used for compensation in the exposure process for obtaining a main print for each frame of the negative film N and for compensation in the exposure process for obtaining an index print. Accordingly, the trend of compensation for the main print for each frame can be made to coincide with the trend of compensation for the index print.

Also, since information regarding exposure compensation amounts and imaged data for respective frames are directly transmitted from the scanner 12 to the drive controller 49, the amount of processing to be performed in the controller 16 can be decreased.

Figure 5A:
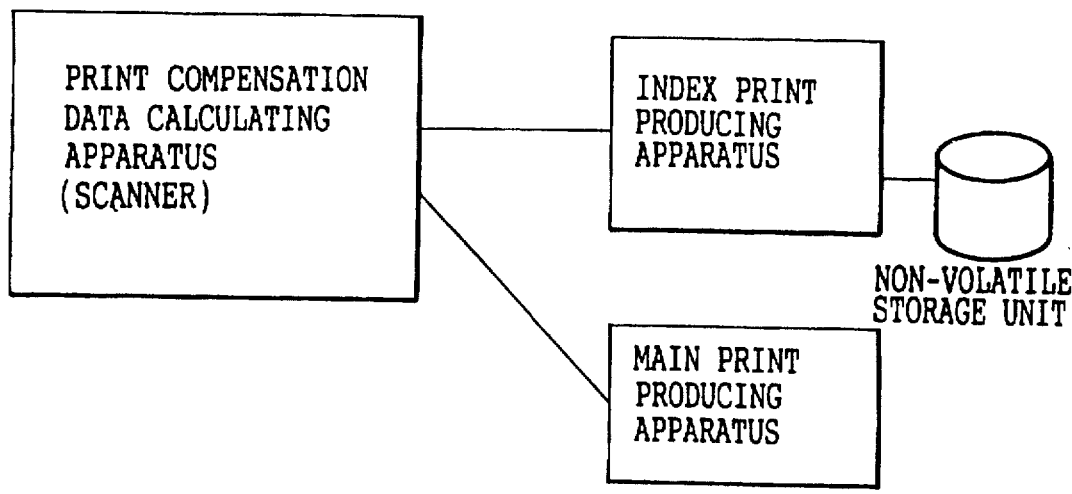
FIG. 5A is a block diagram schematically showing the structure of the second embodiment.
Figure 5B:
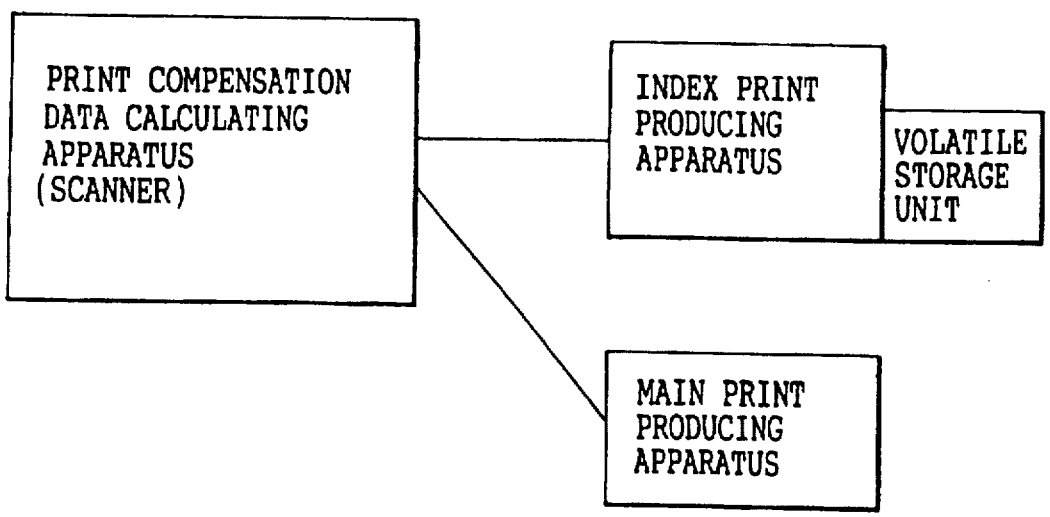
FIG. 5B is a block diagram showing a modification of the structure shown in FIG. 5A.

The above-described second embodiment corresponds to the embodiment shown in FIG. 5A. That is, a main print producing apparatus (the controller 16 in the above-described embodiment) and an index print producing apparatus (the index print section 40 in the above-described embodiment) are both connected directly to a scanner serving as a print compensation data calculating apparatus. Exposure compensation data calculated by the scanner are directly transmitted to the index print producing apparatus and the main print producing apparatus, and compensating operations are performed in these apparatuses based on the same exposure compensation data.

The exposure compensation data received by the index print producing apparatus (the index print section 40) are temporarily stored in an non-volatile storage unit 51, and retrieved therefrom when corresponding frames are subjected to exposure for printing. Although exposure compensation data are stored in the non-volatile storage unit 51 in the embodiment shown in FIG. 5A, exposure compensation data may be temporarily stored in a volatile storage unit (for example, the RAM built in the drive controller 49), as shown in FIG. 5B, for example, in cases where the amount of exposure amount compensation data to be temporarily stored is small and the period time between the time when the exposure compensation data are received and the time when exposure for printing the corresponding frames is performed to obtain an index print is short.

Third Embodiment

A third embodiment according to the present invention will be described with reference to FIG. 6 and FIG. 7.

Figure 6:
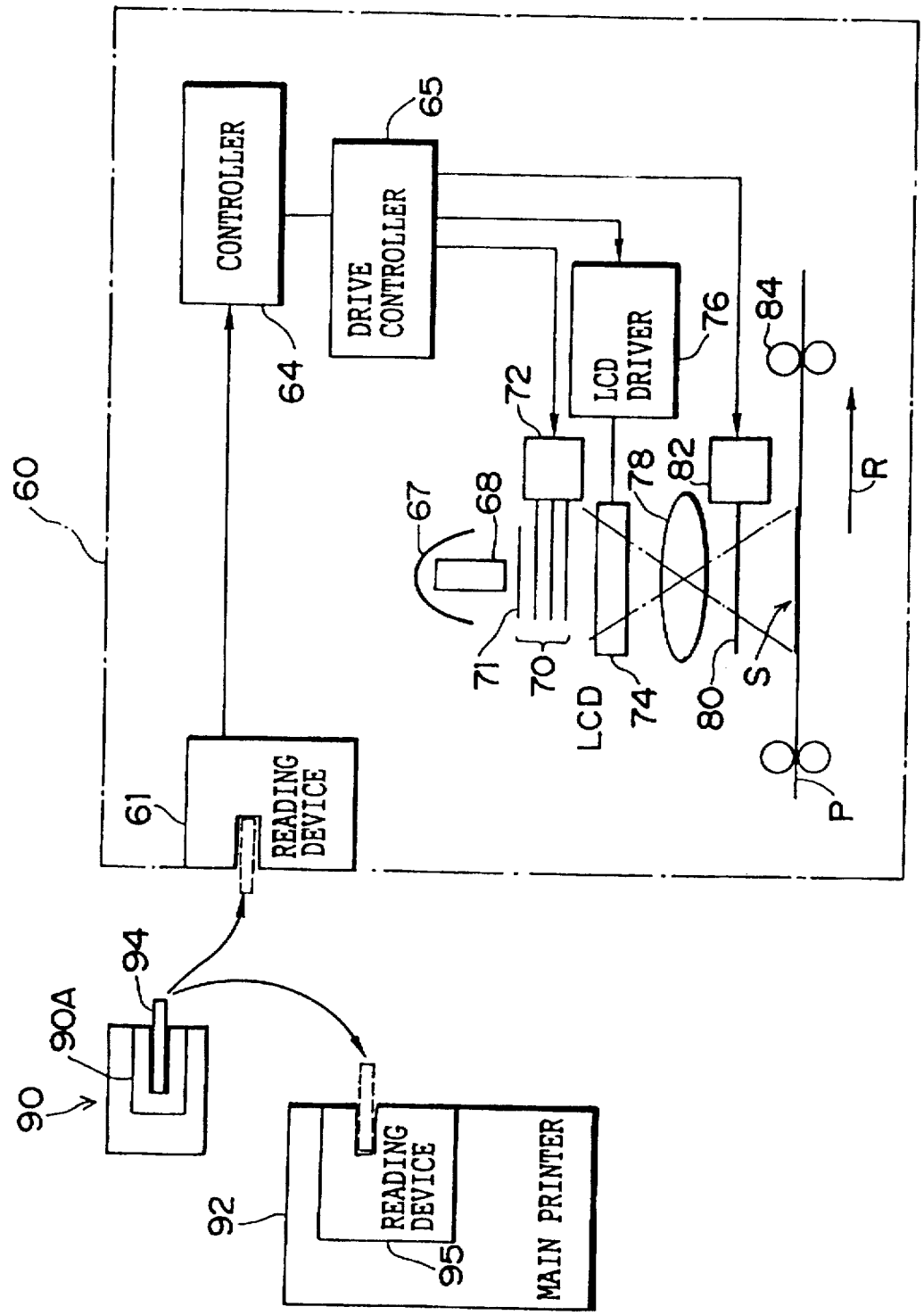
FIG. 6 is a schematic illustration showing the structure of an index printer according to a third embodiment of the present invention.

As shown in FIG. 6, an index printer 60 includes a controller 64 serving as a control section in the index printer 60, and a drive controller 65 which is connected to the controller 64 and drives and controls a filter drive unit 72, an LCD driver 76, and a shutter drive unit 82, which will be described later.

A reading device 61 is connected to the controller 64 to read image information and exposure compensation information stored in a memory card 94. When the memory card 94 is inserted into a position indicated by a broken line in FIG. 6, the reading device 61 reads out the image information and exposure compensation information from the memory card 94.

The index printer 60 also includes a halogen lamp 68 as a device which operate when an index print is printed. Further, a heat preventing filter 71, a color separation filter 70, a liquid crystal panel 74, a projection lens 78, and a black shutter 80 are disposed in this order in the path of light which is radiated from the halogen lamp 68 for exposure. Also, a reflector 67 is disposed right above the halogen lamp 68. The color separation filter 70 has the structure same as that of the color separation filter 44 in the first embodiment shown in FIG. 2. The liquid crystal panel 74, the projection lens 78, and the black shutter 80 have the structures same as those of the liquid crystal panel 48, the projection lens 52, and the black shutter 54 used in the first embodiment.

A scanner 90 is used to capture image in respective frames of a negative film, and to determine exposure compensation amounts for the respective frames. The scanner 90 is provided with an information write-in section 90A so as to write the information of the captured image for respective frames and the information regarding the determined exposure compensation amounts for the respective frames into a memory card 94. When the memory card 94 is set at a position shown in FIG. 6, the image information and the exposure compensation amounts of the respective frames can be written into the memory card 94.

A main printer 92 is used to produce a main print from each frame of the negative film. The main printer 92 is provided with a reading device 95 which has the same function as that of the above-described reading device 61. When the memory card 94 is inserted into a position indicated by a broken line in FIG. 6, the reading device 95 reads out the image information and exposure compensation information from the memory card 94.

Next, operation of the third embodiment will be described.

When an image recorded in each frame of a negative film to be printed is captured by the scanner 90, image data representing the captured image are obtained. Also, an exposure compensation amount for each frame is determined by the scanner 90 based on the image data. When an operator set the memory card 94 into the information write-in section 90A, the image information and the information regarding exposure compensation amounts for the respective frames is recorded into the memory card 94 by the information write-in section 90A.

When a main print is to be made from each frame of the above-described negative film in the main printer 92, the operator inserts the memory card 94, into which the image information and exposure compensation information for the respective frames have been written, into the reading device 95. After that, the exposure compensation information is read out from the memory card 94 by the reading device 95, and exposure compensation is performed based on the read exposure compensation information.

When an index print corresponding to frames of the above-described negative film is made in the index printer 60, the operator inserts the memory card 94 into the reading device 61. After that, the image information and the exposure compensation information for each frame are read out from the memory card 94 by the reading device 61, and the image information and the exposure compensation are transmitted to the drive controller 65 via the controller 64. As a result, exposure compensation is performed by the drive controller 65 based on the image information and the exposure compensation information for each frame.

As is apparent from the above description, the same compensation amount is used for the compensation in the exposure process for obtaining a main print for each frame of the negative film N and for the compensation in the exposure process for obtaining an index print. Accordingly, the trend of compensation for the main print for each frame can be made to coincide with the trend of compensation for the index print.

Also, since image information and exposure compensation information regarding each frame to be subjected to exposure successively are read out from the memory card 94 when index prints are made in the index printer 60, it is not necessary to provide a non-volatile storage unit in the index printer 60 to store the image information and the exposure compensation information.

The above-described third embodiment corresponds to the embodiment shown in FIG. 7. That is, exposure compensation data calculated by a scanner serving as a print compensation data calculating apparatus are transmitted to the main print producing apparatus (the main printer 92) and the index print producing apparatus (the index printer 60) via the memory card 94 serving as a removable non-volatile storage unit, and compensating operations are performed in these apparatuses based on the same exposure compensation data.

Other than the memory card, a CD-ROM, an MO (Magnetic Optical Disc), a removable hard disc, etc., can be used as the removable non-volatile storage unit.

In the first through third embodiments, an index print and a main print corresponding to each of a plurality of frames are obtained by respective exposure processes in which the same compensation information is used. Accordingly, the trend of compensation for main prints can be made to coincide with the trend of compensation for index prints.

Fourth Embodiment

Next, a fourth embodiment of the present invention will be described with reference to FIG. 8 through FIG. 12.

Figure 8:
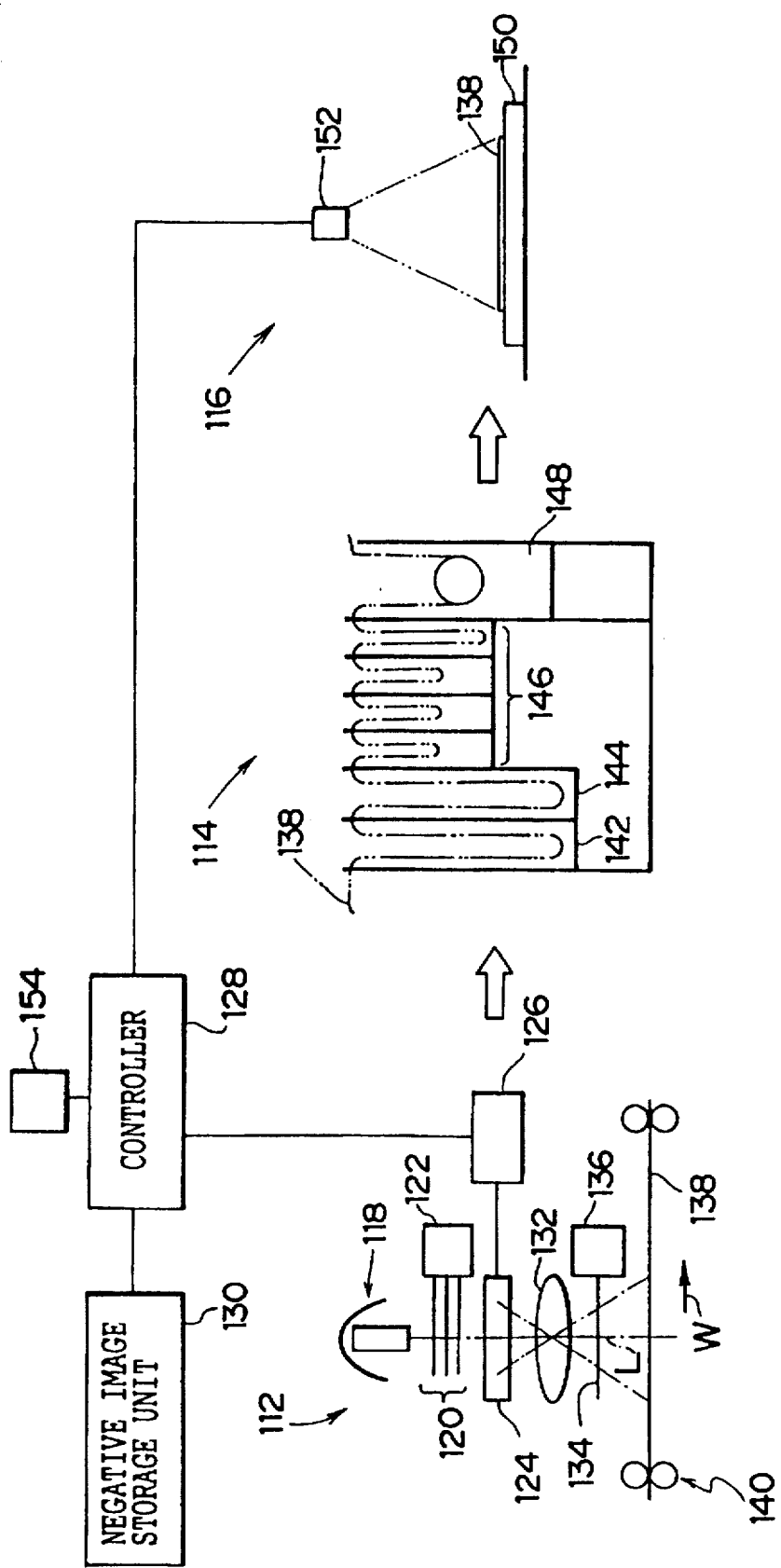
FIG. 8 is a schematic illustration showing facilities at a laboratory relating to a fourth embodiment of the present invention.

FIG. 8 is a schematic illustration showing facilities at a laboratory used in the density adjusting method according to the fourth embodiment of the present invention. The facilities at the laboratory includes a printer 112 for printing a predetermined image on a printing paper 138 by exposure, and a developing apparatus 114 for developing the printing paper 138, which has undergone exposure in the printer 112, to obtain visible images.

The printer 112 is provided with a light source 118 for exposure which is composed of a halogen lamp an a reflector. In place of the halogen lamp, LED may be used to make the light source 118 more compact. Color separation filters 120 of R (red), G (green) and B (blue) are disposed in the optical axis L of light for printing which is radiated from the light source 118. These color separation filters 120 are inserted into and retracted from the optical axis L in response to signals from a drive 122.

Under the color separation filters 120, a liquid crystal panel 124 is disposed to be interposed on the optical axis L. A liquid crystal panel driver 126 is connected to the liquid crystal panel 124 so as to drive the liquid crystal panel 124. A controller 128 is connected to the liquid crystal driver 126 to control the liquid crystal driver 126.

A negative image storage unit 130 is connected to the controller 128. The controller 128 controls pixels of the liquid crystal panel 124 based on negative image data which is input from the negative image storage unit 130.

Under the liquid crystal panel 124 in FIG. 8, a printing lens 132 and a black shutter 134 are successively disposed on the optical axis L. The black shutter 134 opens and closes in response to drive signals from the driver 136 so as to allow light propagation along the optical axis L to pass the black shutter 134 or block off the light. The lens 132 can be moved along the optical axis L so as to change the magnification ratio for enlargement.

Under the black shutter 134 in FIG. 8, a printing paper 138 is disposed. The printing paper 138 is stratiformly wounded onto an unillustrated rotary shaft located at the left side in FIG. 8 and is pulled out from the uppermost layer. The pulled out printing paper 138 is nipped by printing paper transport rollers 140 so that the printing paper 138 is transported by the printing paper transport rollers 140 in the direction of arrow W. The printing paper 138 is positioned at a predetermined position by stopping transportation.

The developing apparatus 114 is provided to develop the printing paper 138 which has undergone exposure in the printer 112. In the developing apparatus 114, color developing tank 142, a bleaching/fixing tank 144, rinsing tanks 146, and a drying section 148 are disposed from the left side in FIG. 8.

The printing paper 138 with printed images is transported to the color developing tank 142. At the color developing tank 142, the printing paper 138 is passed through a developing solution to perform a developing process.

After the developing process, the printing paper 138 is transported to the bleaching/fixing tank 144 adjacent to the color developing tank 142. At the bleaching/fixing tank 144, the printing paper 138 is passed through a fixing solution to perform a fixing process.

After the fixing process, the printing paper 138 is transported to a plurality of rinsing tanks 146 where the printing paper 138 is repeatedly passed through water for performing a washing process.

The washed printing paper 138 is transported to the drying section 148 adjacent to the rinsing tanks 146. At the drying section 148, hot air is jetted to the printing paper 138 for performing a drying process.

When an image is displayed on the liquid crystal panel 124 in the above-described printer 112, there is a case that part of light passes through the liquid crystal panel 124 even when each pixel is completely closed or is driven to block the light. This problem is caused by mechanical deterioration of the liquid crystal panel 124 which occurs during manufacture or with passage of time. This produces unevenness in the density of prints. Even when the liquid crystal panel 124 has no mechanical deterioration, local unevenness in the intensity of light from the light source 118 may cause unevenness in the density of prints. To solve this problem, a density measuring device 116 is provided in the present embodiment as one of means (a test mode) for adjusting unevenness in the density of prints.

The density measuring device 116 is provided to measure the density of prints on the printing paper 138 which has undergone the developing process. The measurement of density is performed when the test mode is selected by the controller 128.

The density measuring device 116 includes a support table 150 for supporting the developed printing paper 138, and a CCD sensor 152. The printing paper 138 transported to the density measuring apparatus 116 is placed on the support table 150, and the density of each print is measured by the CCD 152.

The CCD sensor 152 is connected to a controller 128 so as to transmit the measured density of prints to the controller 128.

A mode setting unit 154 is connected to the controller 128. The mode setting unit 154 is adapted to perform changeover between the test mode and a ordinary mode in which an ordinary image is displayed for exposure, thereby selecting one of these modes. In the test mode, a gray image having a uniform intermediate gradation is used.

When the test mode is selected by the mode setting unit 154, an image having a uniform gradation is displayed on the liquid crystal panel 124 via the liquid crystal panel driver 126. The image with a uniform gradation displayed on the liquid crystal panel 124 is printed on a printing paper 138 by exposure. After development, the printing paper 138 is transported to the density measuring apparatus 116 in which the density of the image is measured by the CCD sensor 152. The data obtained by the measurement are transmitted to the controller 128.

Figures 9A, 9B, 9C:
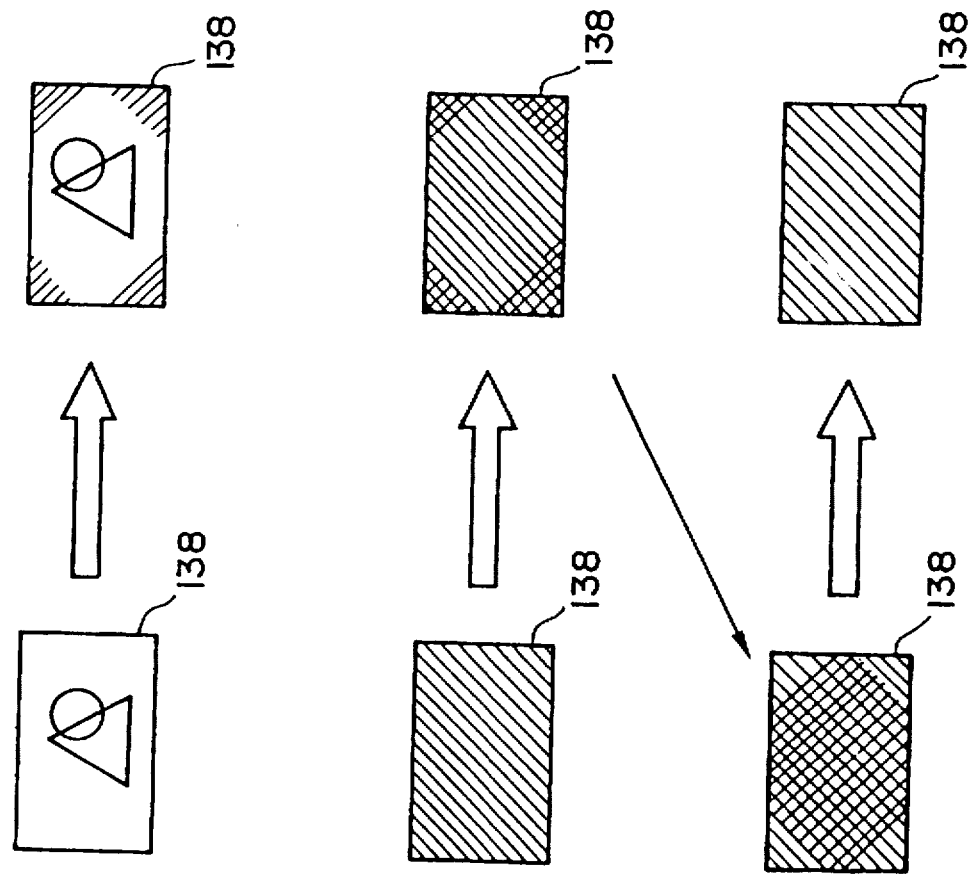
FIGS. 9A–9C are conceptual illustrations for explaining a density adjusting method according to a fourth embodiment of the present invention.

A process for adjusting the density of prints will now be described with reference to FIG. 9B and FIG. 9C. FIG. 9B and FIG. 9C show, on their left sides, prints which are expected to be obtained by printing an image with a uniform gradation displayed on the liquid crystal panel 124 with the assumption that there is no cause which produces unevenness in the density of prints. FIG. 9B and FIG. 9C show, on their right sides, prints which are actually obtained by printing an image with a uniform gradation displayed on the liquid crystal panel 124 when the above-mentioned assumption is not made. The prints on the left sides are called "predicted prints" while the prints on the right sides are called "actual prints".

In other words, when it is assumed that there does not exist a cause such as unevenness in the intensity of light from the light source which produces unevenness in density when a gray image with a uniform gradation is displayed on the liquid crystal panel 124 in the above-described test mode, unevenness in density as in the predicted prints shown on the left side of FIG. 9B is not produced. That is, ideal prints can be obtained. However, in actual cases, a difference or unevenness is produced in the density of prints as in the actual print shown on the right side of FIG. 9B, due to various causes such as unevenness in the intensity of light from the light source.

Since the image used in the test mode is an image (a gray image) having a uniform intermediate gradation, the gradations of pixels on the liquid crystal panel corresponding to a portion on a print where unevenness is produced in the intensity of light are the same as those of pixels on the liquid crystal panel corresponding to a portion on the print where unevenness is not produced in the intensity of light. In this embodiment, pixels of the image with a uniform gradation which correspond to a print are specified, and pixels corresponding to a portion of the print having the maximum density are selected. The difference in density between a selected pixel and an unselected pixels is calculated for all the pixels. The gradation of each pixel is adjusted based on the difference in density calculated in the above-described manner. This adjustment is performed by changing the voltage applied to each pixel.

With this operation, relative differences are produced in the adjusted gradations of the pixels. The gradations of the pixels are shifted while maintaining the relative differences until the selected pixels go into a state in which they do not allow light to pass therethrough. The shifted gradations of the pixels are registered as standards for the respective pixels.

FIG. 9C shows on its left side a predicted print of an image with an intermediate gradation which is obtained by adjusting the gradation. In such a case, no density difference is produced in an actual print as shown on the right side of FIG. 9C.

The specification of pixels can easily be performed by making the resolution of the CCD sensor 152 correspond to the resolution of the liquid crystal panel 124. However, the specification of pixels may be performed in other manners.

Figure 10A:
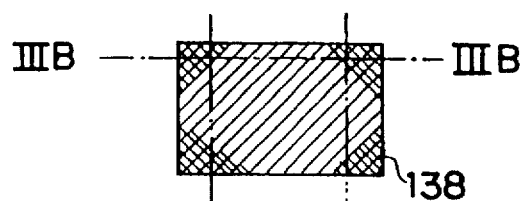
FIGS. 10A–10E are conceptual illustrations for explaining the density adjusting method according to the fourth embodiment of the present invention.
Figure 10B:
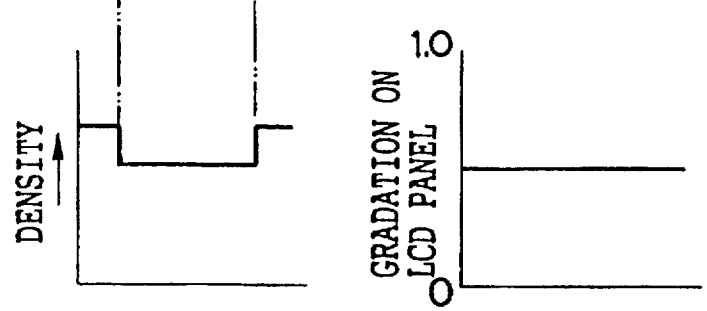

FIG. 10A shows the actual print of an image with a uniform gradation which is shown on the right side of FIG. 9B and in which unevenness in density is produced due to unevenness in the intensity of light. FIG. 10B shows on its left side the density of the print shown in FIG. 10A along line IIIB—IIIB. FIG. 10B also shows on its right side the gradation of the liquid crystal panel 124 at that time. When the gradation is 1.0, the light from the light source 118 completely passes through the liquid crystal panel 124.

When the gradation is 0, the light from the light source 118 does not pass through the liquid crystal panel 124 at all. In the graph shown on the left side of FIG. 10B, a portion having a low density corresponds to the portion which is printed based on the intermediate gradation of the image on the liquid crystal panel 124, while portions having a high density corresponds to the portions where unevenness is produced in the density due to other causes. It is assumed that the densities of the portions of the print shown in FIG. 10A where unevenness is produced in the density are all the same.

Figure 10C:
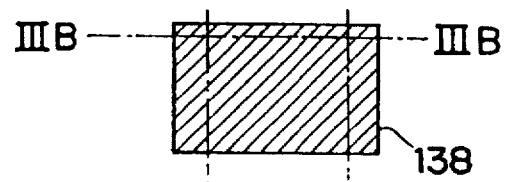
Figure 10D:
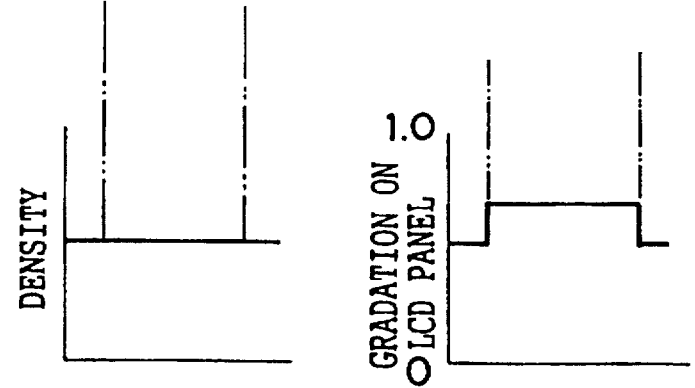

Pixels in the portions having a high density are selected, and adjustment of the gradation is performed. FIG. 10C shows an actual print which is printed based on the adjusted gradation. FIG. 10D shows, on its left side, the densities of the pixels of the actual print (along line IIIB—IIIB), and also shows on its right side the gradation of the liquid crystal panel 124.

Figure 10E:
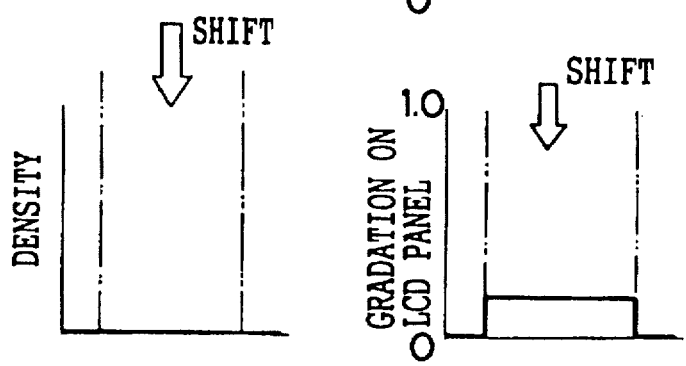

When the gradations of the respective pixels are shifted while maintaining the relative differences between the adjusted gradations shown in FIG. 10D, the reference value shown on the right side of FIG. 10E can be obtained.

Figure 11:
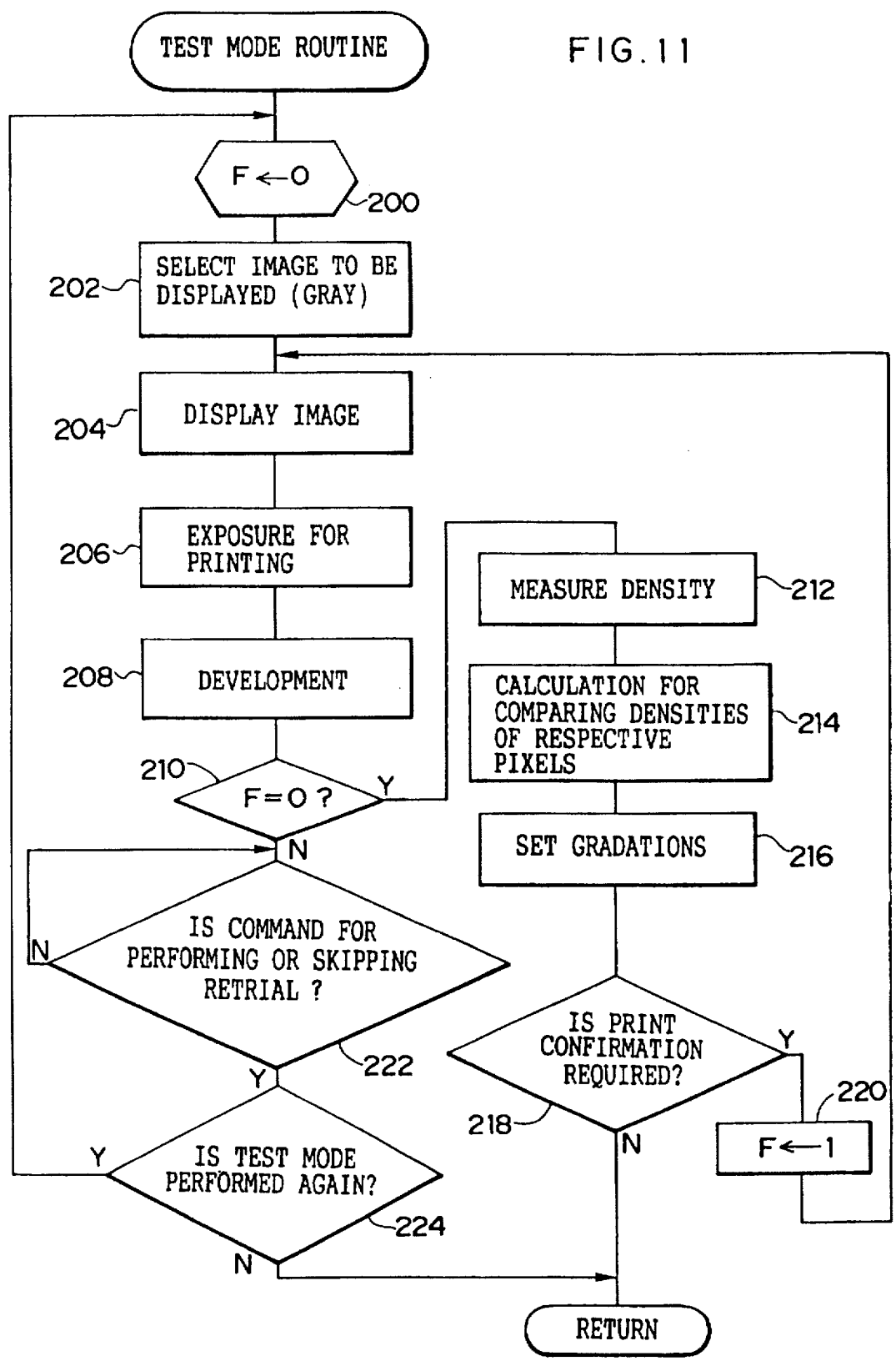
FIG. 11 is a flowchart for explaining the density adjusting method according to the fourth embodiment of the present invention.

Next, operation of the present embodiment will be described with reference to FIG. 11.

The test mode is selected by switching the mode setting unit 154 so as to perform the below-described density adjustment.

In step 200, a flag F is reset to "0", and in step 202, an image to be displayed is selected. A gray image with a uniform intermediate gradation is selected as the image to be displayed because the test mode has been selected.

After the selection of an image to be displayed is completed, the selected image is displayed on the liquid crystal panel 124 in step 204. At this time, all the pixels of the liquid crystal panel 124 have the same gradation.

After the image is displayed, the image is printed onto the printing paper 138 by exposure using light from the light source 118, in step 206. In step 208, the printing paper is developed in the developing apparatus 114.

When unevenness in density is produced, it appears on the developed prints.

After the development, it is judged in step 210 whether the flag F has been set to "1". Since the flag F is set upon the completion of automatic adjustment, the flag F is in a reset state at an initial stage. Accordingly, an affirmative judgment is made in step 210, and the processing moves to step 212, in which the density is measured by the CCD sensor 152 in the density measuring apparatus 116.

After the density measurement, the densities of respective pixels measured by the CCD sensors 152 are compared to each other so as to select pixels corresponding to the portion of the print having the maximum density in step 214. The difference between the maximum density and the density of each of the whole pixels is calculated, and the gradations of the respective pixels are adjusted.

When the calculation is completed and the gradations of the pixels are adjusted, standard gradations for the respective pixels are set in step 216 (shift adjustment).

After the gradations are set, it is judged in step 218 whether the result of density adjustment is to be confirmed by producing a print (print confirmation). When the print confirmation is not performed, the processing in the test mode is ended, and an ordinary print mode is selected by switching the mode setting unit 154. In the ordinary print mode, an image recorded in the negative image recording unit 130 is printed by exposure. As a result, a print having an adjusted density can be obtained.

When the print confirmation is performed, the flag F is set in step 220, and the processing moves back to step 204 to display a gray image with a compensated gradation on the liquid crystal panel 124.

When the image is displayed, printing by exposure and development are performed in steps 206 and 208, respectively, and a negative judgment is made in step 210, because the flow passed through the step 220. As a result, the processing moves to step 222.

After the completion of the development, an operator visually confirms the image so as to judge whether re-adjustment must be performed. When it is judged that retrial or readjustment must be performed, the operator commands the retrial by operating a certain key. When it is judged that retrial is not necessary, the operator commands to skip the retrial by operating another key. An step 222, the processing is in a waiting state until one of those commands is input by the key operation by the operator. When one of the commands is input, the processing moves to step 224.

In step 224, it is judged whether the test mode is to be performed again, i.e., which command the operator has selected. When a print obtained after the density adjustment in step 216 is checked and it is judged that density adjustment by the test mode is not necessary any more, a key operation for skipping the retrial is performed in step 222. In this case, a negative judgment is made in step 224, and the processing for density adjustment ends. When a key operation for performing the retrial is performed in step 222, an affirmative judgment is made in step 224, and the processing goes back to step 200 to repeat the test mode.

By the above-described series of processes, an image is displayed on the liquid crystal panel 124 wherein the pixels of the liquid crystal panel 124 have the adjusted gradations. The image is then printed onto a printing paper and the printing paper is developed to obtain a print having no unevenness in the density. Since these processes are simple, they can be automated.

Figure 12:
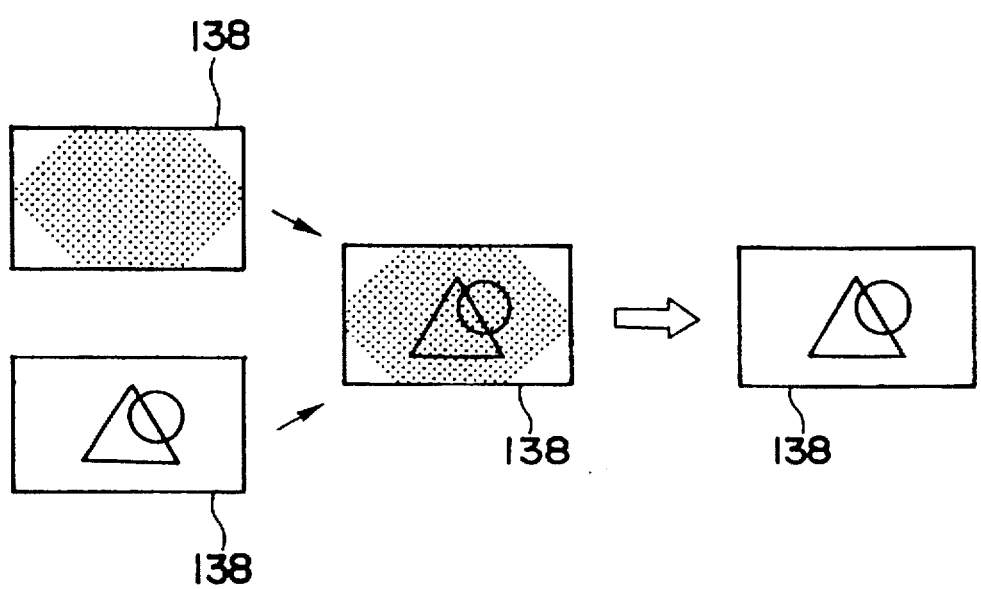
FIG. 12 is a conceptual illustration for explaining the density adjusting method according to the fourth embodiment of the present invention.

FIG. 12 shows the case where after a series of processes for density adjustment have been completed in the test mode, an negative image stored in the negative image storage unit 130 is printed by exposure.

In FIG. 12, an illustration at the upper left shows a predicted print which is obtained after the completion of all the processes for adjusting the gradations of the pixels and for setting the gradations based on the registered density values. An illustration at the lower left shows a predicted print of the negative image stored in the negative image storage unit 130 which is to be produced. An illustration at the middle of FIG. 12 shows a predicted print which is obtained by superposing these two images on one another. An illustration at the right side of FIG. 12 shows an actual print obtained from these images. Unevenness in density has been removed from this print by the above-described series of processes.

Although a uniform gray image is used in the test mode in the present embodiment, another image may be used insofar as the image can provide a uniform gradation to the liquid crystal panel 124.

In the present embodiment, pixels of the portion having unevenness in density are adjusted based on the portion having the maximum density. However, the gradations of these pixels may be adjusted based on the portion having the smallest density when the density at a portion used as a reference and the adjustment for the gradations of pixels corresponding thereto are applied according to the present embodiment. The portion used as a reference can be appropriately selected based on the area in which unevenness in density occurs, the gradation of an image with a uniform gradation used in the test mode, etc.

In the present embodiment, the process for removing unevenness in density which is produced due to unevenness in the intensity of light from the light source 118 has been described. However, the present embodiment can be applied to removing of unevenness in density which is produced due to spots produced on the filter 120.

For example, when stains are deposited on one of the filters of the color separation filter 120, unevenness in density is produced. The present embodiment can be applied to such a case. That is, unevenness in density is measured when exposure is performed using the filter with the stains, and a negative image is displayed on the liquid crystal panel 124 while the density adjustment is performed in the above-described manner. By this procedure, prints without unevenness in density can be obtained. In the case where it is desired to make the gradations of each pixel in three primary colors the same, the adjusted gradations may be used in each exposure process using each of the filters even when unevenness in density is caused by only one of the filters.

Although the CCD sensor 152 is used as a means for measuring density in the present embodiment, other senor may be used insofar as the sensor can measure the density of a test mode image printed onto the printing paper 138.

The fourth embodiment of the present invention can be applied to an index printer which can print both images having an ordinary size and index images. In this case, the time required for adjustment can be shorted by automating the adjustment operation when a quick process is desired. Also, since the number of components does not increase, the size of the apparatus does not increase. Also, since each image is reduced in an index print, unevenness in density greatly affects the quality of index prints. However, such an adverse effect can be mitigated by using the fourth embodiment of the present invention.

As described above, in the present embodiment, unevenness in density produced in the image printing stage can easily and automatically be adjusted.

While the embodiments of the present invention as herein disclosed constitute preferred forms, it is to be understood that other forms might be adopted.

What is claimed is:

1. A density adjusting method for a printer in which there is provided a liquid crystal panel in which a plurality of pixels are arranged in a matrix and each pixel is adjustable to a predetermined gradation, and wherein an image is displayed on the liquid crystal panel disposed on a path of exposure light such that each pixel of the liquid crystal panel is controlled based on a gradation which is set while using, as a standard, one of a first state in which each pixel allows the light to completely pass therethrough and a second state in which each pixel completely blocks the light, said method comprising the steps of:

displaying an image with a uniform gradation on the liquid crystal panel;

obtaining a printed image of the image;

measuring the density of the obtained printed image so as to select a pixel or a plurality of continuous pixels having the minimum or maximum density;

calculating a difference in density between each pixel and said selected pixel or said selected plurality of continuous pixels and adjusting the gradation of each pixel based on the difference; and shifting the gradations of the pixels until one of the pixels reaches said first or second state while maintaining relative differences in gradation after the adjustment, and registering the shifted gradation of each pixel as a standard of each pixel.

2. A density adjusting method according to claim 1, wherein the density of said printed image is measured by a CCD sensor serving as a density measuring apparatus.

3. A density adjusting method according to claim 2, wherein specification of pixels of said liquid crystal panel corresponding to different portions of a printed image is performed by making the resolution of said CCD sensor correspond to the resolution of said liquid crystal panel.

4. A density adjusting method according to claim 1, wherein said density adjusting method is used when an index image is printed.

* * * * *